United States Patent [19]

Mason et al.

[11] Patent Number: 5,239,669
[45] Date of Patent: Aug. 24, 1993

[54] COUPLER FOR ELIMINATING A HARDWIRE CONNECTION BETWEEN A HANDHELD GLOBAL POSITIONING SYSTEM (GPS) RECEIVER AND A STATIONARY REMOTE ANTENNA

[75] Inventors: Stanley L. Mason, San Jose; Lynn Weber, Saratoga; Arthur N. Woo, Cupertino, all of Calif.

[73] Assignee: Trimble Navigation Limited, Sunnyvale, Calif.

[21] Appl. No.: 830,737

[22] Filed: Feb. 4, 1992

[51] Int. Cl.$^5$ .......................... H04B 7/14; H01Q 1/32
[52] U.S. Cl. ...................... 455/12.1; 455/14; 455/272; 343/713; 343/769; 343/700 MS
[58] Field of Search ............... 455/14, 345, 346, 280, 455/12.1, 54.1, 54.2, 272, 3.2, 3.3, 13.1, 11.1; 343/701, 713, 702, 700 MS, 767; 333/17.2

[56] References Cited

U.S. PATENT DOCUMENTS

| | | | |
|---|---|---|---|
| 4,457,006 | 6/1984 | Maine | 455/264 |
| 4,771,291 | 9/1988 | Lo et al. | 343/700 MS |
| 4,845,738 | 7/1989 | Takano | 455/90 |
| 5,070,340 | 12/1991 | Diaz | 343/767 |
| 5,148,452 | 9/1992 | Kennedy et al. | 455/207 |

OTHER PUBLICATIONS

W. J. Robertson, The Transistorized Dipole Antennafier, May 15, 1963.

Primary Examiner—Reinhard J. Eisenzopf
Assistant Examiner—Nguyen Vo
Attorney, Agent, or Firm—Thomas E. Schatzel

[57] ABSTRACT

A system, according to an embodiment of the present invention, comprises a coupler, a remote antenna, and a handheld GPS receiver. The remote antenna has a microstrip RHCP receiving element and a low noise amplifier (LNA) powered by the coupler over an interconnect cable. The coupler has a slotline antenna and a driver circuit. The coupler re-radiates GPS satellite signals received by the remote antenna with a slotline antenna to the GPS receiver. In a typical installation, such as a car, a user holds the GPS receiver while in the front seat. The coupler mounts to the windshield and the cable runs to remote antenna mounted on the roof of the car. The coupler can then re-radiate GPS satellite signals effectively to the GPS receiver even when the two are separated by as much as six feet. The shielding of GPS signals by the metal of the car is thereby avoided as a problem that can prevent operation of the GPS receiver.

3 Claims, 2 Drawing Sheets

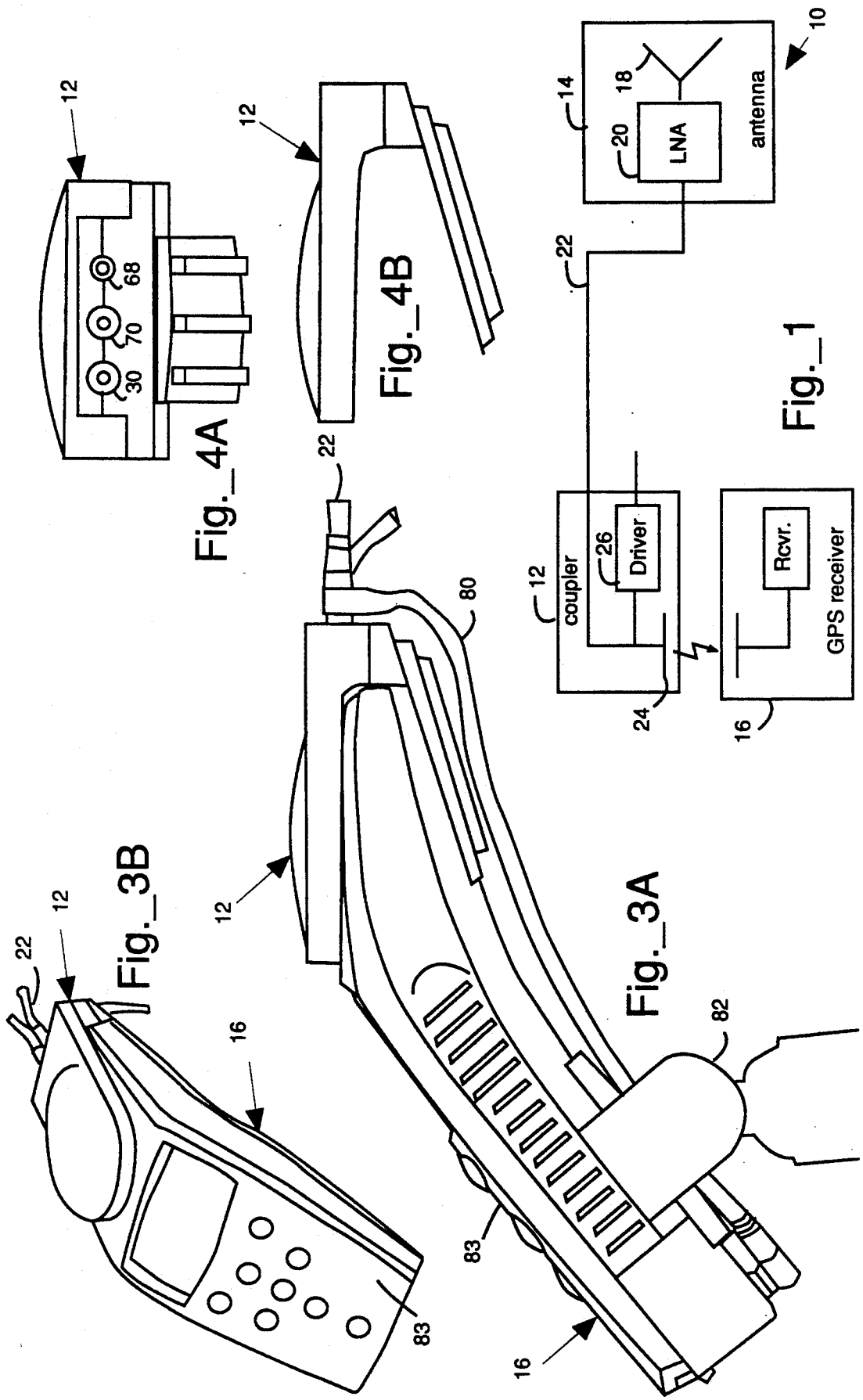

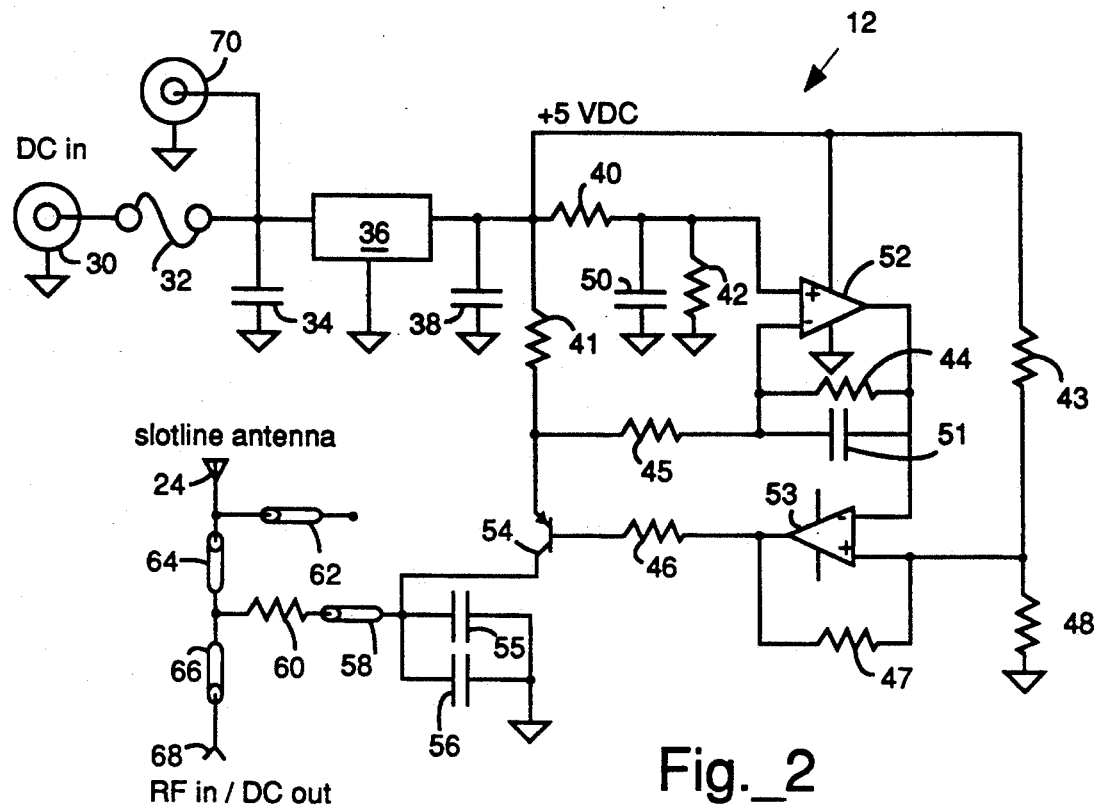
Fig._2
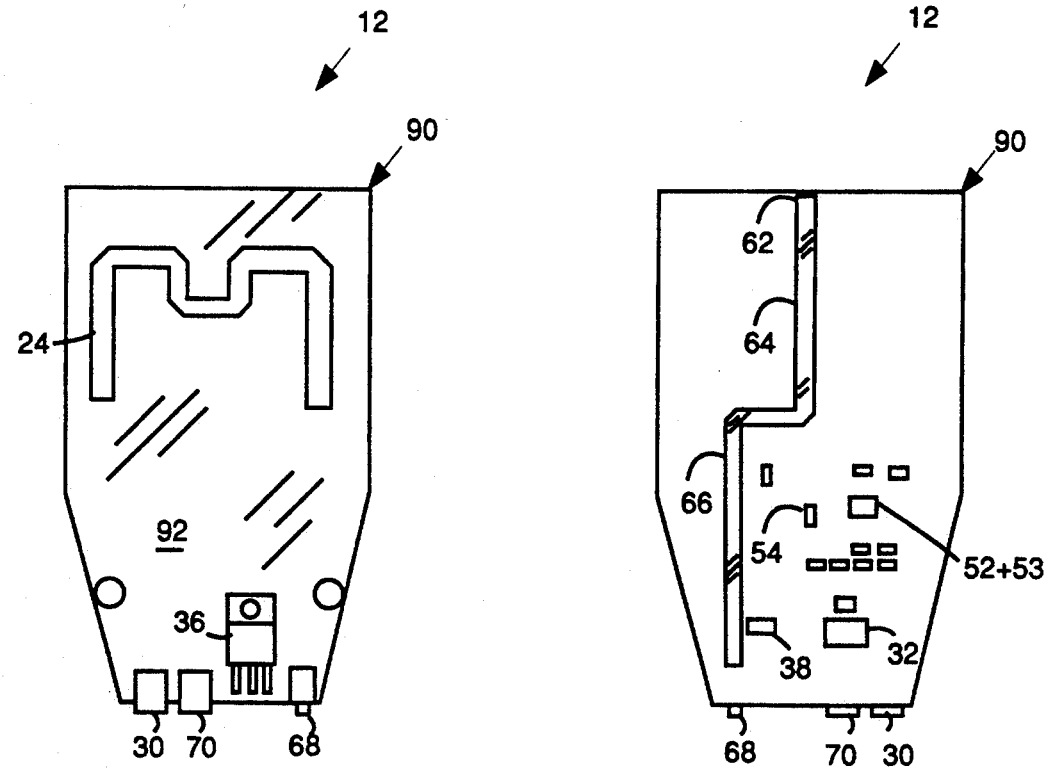
Fig._5A  Fig._5B

COUPLER FOR ELIMINATING A HARDWIRE CONNECTION BETWEEN A HANDHELD GLOBAL POSITIONING SYSTEM (GPS) RECEIVER AND A STATIONARY REMOTE ANTENNA

BACKGROUND OF THE INVENTION

1. Field of the Invention

The invention relates generally to handheld Global Positioning System (GPS) receivers and specifically to devices that will allow indoor or in-vehicle operation of the GPS receivers by using an externally mounted remote antenna.

2. Description of the Prior Art

The United States Department of Defense has placed in orbit a group of satellites, as part of a Global Positioning System (GPS), that can be used by civilians and the military alike to get automated and highly-accurate earth position coordinates on easy to read digital displays. Determining where you are has been a particular problem for seafarers for thousands of years. Now, GPS enables small sailboat owners and even individual combat soldiers to get their positions to within a few meters, using handheld portable equipment.

Microminiaturization of electronic circuits has advanced to the point that a complete handheld, personal GPS receiver can be made and sold at readily affordable prices and housed in a case that resembles a pocket calculator in appearance and size.

SUMMARY OF THE PRESENT INVENTION

It is therefore an object of the present invention to provide a convenient and efficient way to couple a handheld GPS receiver to an external antenna capable of receiving signals from GPS satellites.

Briefly, a GPS receiver system, according to an embodiment of the present invention, comprises a coupler, a remote antenna, and a handheld GPS receiver. The remote antenna has a microstrip RHCP receiving element and a low noise amplifier (LNA) powered by the coupler over an interconnect cable. The coupler has a slotline antenna and a driver circuit. The coupler re-radiates GPS satellite signals received by the remote antenna with a slotline antenna to the GPS receiver. In a typical installation, such as a car, a user holds the GPS receiver while within the car. The coupler mounts to the windshield and the cable runs to remote antenna mounted on the roof of the car. The coupler can then re-radiate GPS satellite signals effectively to the GPS receiver even when the two are separated by as much as six feet. The shielding of GPS signals by the metal of the car is thereby avoided as a problem that can otherwise prevent operation of the GPS receiver.

An advantage of the present invention is that a portable handheld GPS receiver can be used inside a signal depleted area, such as the inside of a car, without having to tether the GPS receiver with a cable to a remote antenna.

Another advantage of the present invention is that a GPS receiver has the freedom to be moved about without a cable.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a block diagram of a system to couple a GPS receiver to a remote antenna according to the present invention;

FIG. 2 is a schematic diagram of the coupler of FIG. 1;

FIG. 3A is a side view of the GPS receiver and coupler of FIG. 1 connected together in close proximity;

FIG. 3B is a perspective view of that shown in FIG. 3A;

FIG. 4A is an end view of the coupler of FIG. 1;

FIG. 4B is a side view of the coupler of FIG. 1; and

FIGS. 5A and 5B are front and back views of the printed circuit board assembly of the coupler of FIG. 1.

DETAILED DESCRIPTION OF THE PREFERRED EMBODIMENTS

In FIG. 1, a system 10, according to a first embodiment of the present invention, comprises a coupler 12, a remote antenna 14, and a handheld GPS receiver 16. Remote antenna 14 has a microstrip RHCP receiving element 18 and a low noise amplifier (LNA) 20 powered by coupler 12 over an interconnect cable 22. Coupler 12 has a slotline antenna 24 and a driver circuit 26. Coupler 12 re-radiates GPS satellite signals, received by remote antenna 14, through slotline antenna 24 to GPS receiver 16. In a typical installation, such as a car, a user holds GPS receiver 16 while in the front seat. Coupler 12 mounts to the windshield and cable 22 runs to remote antenna 14 mounted on the roof of the car. Coupler 12 can re-radiate effectively to GPS receiver 16 even when the two are separated by as much as six feet.

FIG. 2 shows the circuit details of coupler 12, which comprises a DC input power jack 30, a fuse 32, an input filter capacitor 34, a three-terminal five volt regulator 36, an output filter capacitor 38, and a current limiting circuit comprised of a plurality of resistors 40-48, a capacitor 50, a capacitor 51, a pair of op-amps 52 and 53, and a series of transistor 54. If excessive current passes through resistor 41, as a result of a short for example, op-amp 52 amplifies the voltage developed across resistor 41, which causes op-amp 53 to try to switch off transistor 54. This will cause the current through resistor 41 to drop and some current limit equilibrium point will be found. The current limit will be basically controlled by the ratio of resistor 43 to resistor 48. Direct current can pass through but radio frequency signals will be trapped by a filter network comprising a pair of capacitors 55 and 56, an element 58, and a resistor 60. A network of three elements 62, 64, and 66 couple RF energy received at a jack 68 from cable 22 to slotline antenna 24. A jack 70 connects to a battery eliminator, when one is available.

FIGS. 3A and 3B show coupler 12 clipped on to the cradle of GPS receiver 16. A power cable 80 may be used to connect jack 70 on coupler 12 and the power input to GPS receiver 16. A mount 82 provides a convenient angle and location for the user to access a control panel 83 on GPS receiver 16. FIGS. 4A and 4B show coupler 12 separated from GPS receiver 16.

FIGS. 5A and 5B show a typical printed circuit board assembly (PCBA) 90 that comprises the circuitry of coupler 12. Slotline antenna 24, as illustrated in FIG. 5A, is a meandered type. A non-meandered type would require additional space and thus a meandered type is preferred. On the opposite side of PCBA 90, illustrated in FIG. 5B are elements 62, 64, and 66. Most of the active and passive components of coupler 12 are chip type and small outline package (SOP) and are mounted to PCBA 90 using surface mount technology (SMT). These components are identified by the element numbers given in FIG. 2 and approximate locations are shown. Most of one side of PCBA 90 is covered by a groundplane 92, as seen in FIG. 5A.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A GPS radio signal coupler, comprising:
   a remote antenna unit for receiving GPS signals at non-obstructed locations from GPS satellites in orbit around the earth and including a microstrip antenna, said microstrip antenna being a right-hand circularly-polarized (RHCP) type, and a low noise amplifier (LNA) for amplifying signals received by said microstrip antenna;
   a connecting cable for conducting amplified GPS signals output from said LNA and for conducting regulated DC power to operate said LNA; and
   a reradiation coupling unit including a slotline antenna connected to the connecting cable for radiating GPS signals amplified by said LNA, said slotline antenna comprising a slot that is a meandered type implemented on a printed circuit board (PCB), said slot being on the same side of said PCB as an associated groundplane and opposite to a feedpoint, and a power supply means connected to the connecting cable for regulating said DC power to said LNA, said power supply means including a voltage regulator, a current limiting circuit and a filter to separate radio frequency signals from DC power, all of which are mounted to said printed circuit board.

2. The coupler of claim 1, wherein:
   said power supply means further comprises a jack for receiving a power cable for supplying DC power, and a jack for connecting the connecting cable to the reradiation coupling unit.

3. The coupler of claim 1, further comprising:
   a housing for the reradiation coupling unit including a cradle wherein said slotline antenna is held in close proximity to a handheld GPS receiver that is captive within said cradle.

* * * * *